(12) United States Patent
Preston et al.

(10) Patent No.: US 8,375,733 B2
(45) Date of Patent: Feb. 19, 2013

(54) LOW-NOISE FAN CONTROL FOR REFRIGERATION CYCLE

(75) Inventors: Philip K. Preston, Norhfield, IL (US); Phil A. Emms, Elkton, MD (US)

(73) Assignee: Polyscience, Niles, IL (US)

( * ) Notice: Subject to any disclaimer, the term of this patent is extended or adjusted under 35 U.S.C. 154(b) by 707 days.

(21) Appl. No.: 12/543,230

(22) Filed: Aug. 18, 2009
(Under 37 CFR 1.47)

(65) Prior Publication Data
US 2011/0041532 A1 Feb. 24, 2011

(51) Int. Cl.
*F25D 17/04* (2006.01)
*F25D 17/00* (2006.01)
*F25B 39/04* (2006.01)

(52) U.S. Cl. ................. 62/186; 62/181; 62/183; 62/507

(58) Field of Classification Search .................... 62/186, 62/177, 180, 181, 183, 222, 223, 507; 165/247
See application file for complete search history.

(56) References Cited

U.S. PATENT DOCUMENTS

| | | | |
|---|---|---|---|
| 4,571,951 A | 2/1986 | Szymaszek | |
| 5,460,009 A * | 10/1995 | Wills et al. | ...................... 62/180 |
| 5,632,154 A | 5/1997 | Sibik et al. | |
| 5,782,103 A | 7/1998 | Schmidt | |
| 5,809,794 A | 9/1998 | Sibik et al. | |
| 6,006,142 A | 12/1999 | Seem et al. | |
| 6,408,228 B1 | 6/2002 | Seem et al. | |
| 6,668,570 B2 | 12/2003 | Wall et al. | |
| 6,732,540 B2 | 5/2004 | Sugihara et al. | |
| 6,783,080 B2 | 8/2004 | Antoniou et al. | |
| 6,845,627 B1 | 1/2005 | Buck | |
| 6,993,922 B2 | 2/2006 | Wall et al. | |
| 7,137,264 B2 | 11/2006 | Simadiris et al. | |

* cited by examiner

*Primary Examiner* — Chen Wen Jiang (57) ABSTRACT

This disclosure relates to a multi-PID controller system where a variable such as the temperature of a fluid in a reservoir is stabilized using two or more PID controllers to optimize the control of an actuator, such as a flow control valve of a refrigeration system, to control a flow rate. The system also allows for the optimization of the PID control of a fan speed based on the optimized regulation of the control valve and a comparison with other input variables. The setpoint temperature is further stabilized by setting up in proximity of the desired setpoint a deadband analysis to prevent overlap of the PID-driven heat regulation and the multi-PID-driven cold regulation.

7 Claims, 4 Drawing Sheets

LOW-NOISE FAN CONTROL FOR REFRIGERATION CYCLE

FIELD OF THE DISCLOSURE

This disclosure relates to a low-noise fan control mechanism for a refrigeration cycle, and more particularly, to a mechanism for reducing the average speed of a control fan using either a clipped sine power input or a variable fan speed control along a series of proportional integral derivative controllers and the use of temperature variations at an element of the refrigeration cycle to control the variable fan speed control.

BACKGROUND

Refrigeration systems with control mechanisms allow for the regulation and control of an environmental parameter such as temperature within the system. These control mechanisms rely on one or a plurality of measured values to regulate a system. A user sets a desired temperature of a fluid or gas in a volume via an interface. A control mechanism using an internal algorithm alternatively turns on or turns off one or a plurality of active elements capable of acting upon the temperature and ultimately regulates the temperature as it varies over time and under variable load conditions.

In some applications, such as cooking or scientific research, the temperature of a specimen must be controlled precisely, often to within a fraction of a degree. In the past, the precise control of the temperature has often been the sole design parameter of these systems, but in recent years, new-generation control systems must also be respectful of their environment. Problems related to different control mechanisms include creation of residual heat, high and often uninterrupted power consumption, and parasitic noise associated with cooling mechanisms such as fans. For example, office workers may work in an environment where light fixtures produce noise when energized, computers are cooled by noisy fans, air is circulated via a noisy overhead ventilator, and windows are often poorly insulated from external noise. As a consequence, noise pollution is created, which can lead to occupational concerns in the workplace. As new devices are produced and sold, the need for cost-effective, wisely controlled, energy-efficient, and low-noise products has become a reality.

Within the scope of this patent, one technology is used to describe embodiments of the invention, namely, control systems associated with refrigeration cycles. One of ordinary skill in the art will understand that noise reduction, while of great importance to the field associated with the described technology, should not be viewed as specific to refrigeration technology and could be applied with equal or greater force to other technologies. By way of example, video cameras equipped with microphones benefit from low background noise and low residual noise produced by the different components operating within the camera itself. Further, electronic equipment held by camera operators or stored in the proximity of a camera benefits from a low residual noise control system.

In one possible embodiment, a vapor-compression, closed-loop refrigeration system can be used to cool or heat a fluid. A plurality of elements within this closed-loop system can be monitored to control the temperature of the fluid. A fan blows air over a condenser coil and a compressor to cool these elements and dissipate heat. These fans, generally in the shape of small propellers, rotate around an axis and blow air from the fan blades to cooling fins. These fans are often left to cycle on and off based on the cooling needs of the system as regulated by the control mechanism.

Fans are means of forced convection. Most of the time, a fan capable of controlling the temperature of an element is not in operation when the element is at its optimum temperature. Rather, fans are energized only when the element exceeds a desired temperature or temperature range. Convective cooling often remains very effective even when fan speed is low. Because convective fans are either on or off, they are often turned on and may burn up quickly. The presence or absence of noise from changes in operating status are often bothersome. Known control mechanisms turn the fan off and wait until the system heats beyond a desired value, at which time the fan is turned on to its maximum speed. This system is not optimized to control the temperature very precisely. Another embodiment is to use a variable-speed fan, to fix gradient fan speeds based on different levels of input power, and to correlate these speeds with the compressor outlet temperature or the pressure at the compressor outlet. These changes in speed also result in abrupt changes in the system and associated noise disturbances. While an increase in speed may significantly increase the noise produced by the fan, it may not significantly improve the heat dissipation capacities. What is needed is a control mechanism capable of regulating a fan while producing little noise but without creating adverse temperature variations in the fluid to be cooled by the fan as the fan is regulated.

In addition, fan controls can be stand-alone or part of a proportional integral derivative controller ("PID controller" or "PID"). PID controllers are present in a wide range of instruments and can be used to control temperature, pressure, or other parameters. For example, cooking instruments, laboratory testers, and therapeutic equipment use fluid baths operating at a controlled temperature. Under normal operating conditions, as the temperature of a fluid is controlled, energy drained or added to the fluid by a body in contact with fluid alters the fluid temperature unless a secondary heat flux is added via a heater or a cooler to regulate the desired setpoint.

Control mechanisms must compensate in real time to introduce or remove heat from the fluid to stabilize the temperature at the setpoint. Based on a time-incremental method of measure, sensors measure the variable to be controlled on a real-time basis. Likely error and fluid variable change can be anticipated by using a model that reviews linear variation of variations and associated error over past-time increments using a proportional controller, reviews the derivative of change of the error over past-time increments using a derivative controller, and uses an integral controller to calculate the rate of change of the error over time. The PID controller includes a proportional component (P), an integral component (I), and a derivative component (D) used in concert to correct the error. Each of these three components includes a tuning factor called the "gain."

The use of a PID controller with variable gains to minimize the error of a setpoint variable, such as temperature in a fluid bath, is known, as is the use of a first PID to control a heat source and a second PID to control a refrigeration system of a temperature control device. In yet another known device, an external control with a proportional signal based on a temperature of the refrigerant system is supplied to a single PID controller. This external signal allows for the reverse calculation of an unmeasured parameter in the system to better operate a single PID controller. What is needed is an improved system based on PID control technology capable of correcting a fluid temperature error while limiting noise associated with controlling a fan used in the system.

SUMMARY

This disclosure relates to a low-noise fan control mechanism for a refrigeration cycle, and more particularly, to a mechanism for reducing the average speed of a control fan using either a clipped sine power input or a fan speed control along a series of proportional integral derivative controllers, or a temperature gradient at an element such as the compressor in a refrigeration cycle to control fan speed. In one embodiment, a low-noise fan control within the memory of a calculator uses measured temperature thresholds in conjunction with a ratio-based equation to determine a signal drive of the fan as an outlet temperature varies. The signal can be controlled in one embodiment by a clipped signal between a stall drive speed and a maximum drive speed. In another embodiment, the fan drive signal is also controlled using a first PID controller linked to a flow valve control. In yet another embodiment, second and third PID controllers can be used as part of the control algorithm to regulate the drive signal to the fan. In another embodiment, the fan is regulated using a PID based on a temperature gradient at only one element of a refrigeration system.

BRIEF DESCRIPTION OF THE DRAWINGS

Certain preferred embodiments are shown in the drawings. However, it is understood that the present disclosure is not limited to the arrangements and instrumentality shown in the attached drawings.

DETAILED DESCRIPTION

For the purposes of promoting and understanding the invention and principles disclosed herein, reference is now made to the preferred embodiments illustrated in the drawings, and specific language is used to describe the same. It is nevertheless understood that no limitation of the scope of the invention is thereby intended. Such alterations and further modifications in the illustrated devices and such further applications of the principles disclosed as illustrated herein are contemplated as would normally occur to one skilled in the art to which this disclosure relates.

Figure 1:
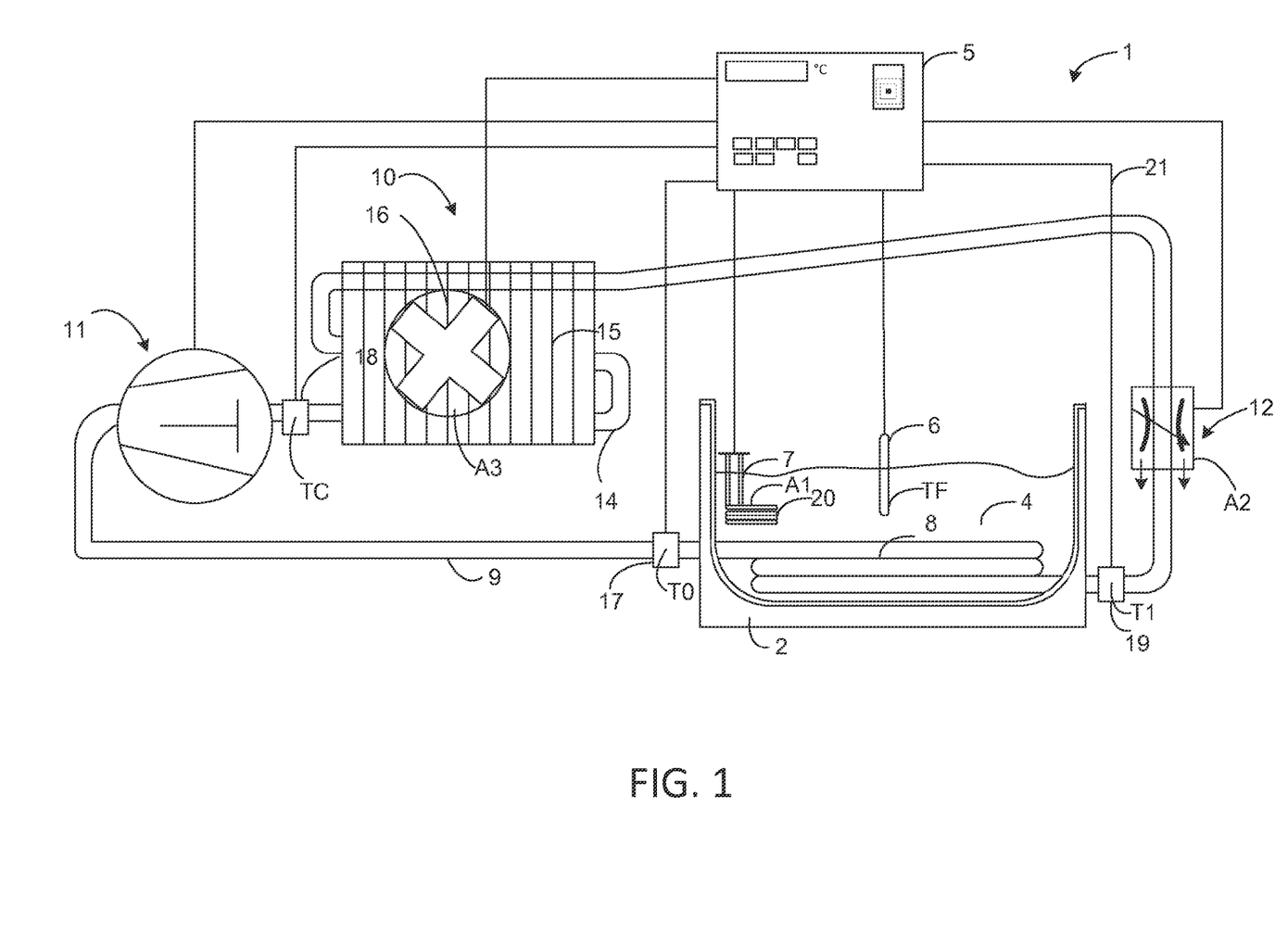
FIG. 1 is a diagram of a fluid reservoir within a heating and refrigeration system for temperature regulation using a flow control valve, a resistive heater, and a cooling fan speed according to an embodiment of the present disclosure.

In one embodiment shown in FIG. 1, a control system 1 for a closed-loop refrigeration system includes a generally insulated 3 liquid tank 2 where a volume V of a fluid 4 is kept at a fluid temperature $T_F$. The temperature of the liquid $T_F$ is measured by a sensor 6 and is controlled using an up-and-down temperature control system, namely, a heating circuit and a cooling circuit. The heating circuit includes a heater 7 in the form of a resistive coil 20 placed below the surface of the fluid 4. The heater 7 can be a resistor capable of thermal loss when a voltage differential is applied to the two ends of the heater 7.

The cooling circuit includes a refrigeration loop 9 with a condenser 10, a compressor 11, an evaporator 8, and a flow control valve 12. In one embodiment, the condenser 10 includes a fan 16 blowing air through fins 15 attached to a serpentine 14. Since the serpentine 14 has been heated while in contact with the fluid 4 in the tank 2 (i.e., the heat in the fluid 4 has entered the refrigeration cycle, thus cooling the fluid 4), the fan 16 releases heat in the air after the refrigeration liquid found in the refrigeration loop 9 is compressed in the compressor 11.

A condenser fan 16 with either a AC or DC line voltage is driven to cool a condenser 10 as part of a software application executing an algorithm running within the memory of an external calculator 5 or any type of calculator. A high threshold ($T_{HT}$) value is determined for the outlet of the compressor 11, and a low threshold ($T_{LT}$) is also determined for the compressor outlet 11. In one embodiment, the thresholds can be taken as $T_{HT}$=85° C. and $T_{LT}$=75° C. In other embodiments, these values can be increased, for example, to 110° C. for high-end applications.

In one embodiment, a temperature ($T_C$, or Temperature exit Compressor) is measured using the compressor exit sensor 18. $T_C$ is then compared to $T_{HT}$ and $T_{LT}$. The fan 16 is driven by a signal Fan % that is calculated at a time T (Fan %$_T$) and at an interval of time a moment later at T+Δ(Fan %$_{T+\Delta}$).

In another embodiment, two temperatures are measured ($T_C$, or Temperature exit Compressor, and $T_2$, or Temperature exit Condenser) using two sensors 18, 22 as shown in FIG. 1.

In one embodiment, the calculation of Fan %$_{T+\Delta}$ is determined based on the measure of $T_C$ also at T+Δ. If $T_{CT+\Delta}$>$T_{HT}$, then Fan %$_{T+\Delta}$=Upper Limit, where in one embodiment the Upper Limit is 70%. If $T_{CT}$+Δ<$T_{LT}$, then Fan %$_{T+\Delta}$=Stall Limit, where in one embodiment the Stall Limit is 24%. And if $T_{CT+\Delta}$ is in the range between both $T_{HT}$ and $T_{LT}$, then the following formula is used:

If $T_{HT} > T_{CT+\Delta} > T_{LT}$, $$\text{then Fan \%}_{T+\Delta} = \left\{ \left[ \frac{T_C - T_{LT}}{T_{HT} - T_{LT}} \right] * (\text{Fan \%}_T - 24\%) \right\} + 24\%$$

Any calculated value of Fan %$_{T+\Delta}$ that falls below the Stall Limit is then equated to the Stall Limit, and any calculated value of Fan %$_{T+\Delta}$ above the Upper Limit is also equated to the Upper Limit. Finally, the condenser fan 16 is then driven by a signal derived in output from the value of Fan %$_{T+\Delta}$. If Fan %$_{T+\Delta}$ is greater than or equal to 70%, then the fan 16 is driven by a maximum signal of 100% of the total signal. Otherwise, the fan 16 is driven by a signal proportional to Fan %$_{T+\Delta}$. This formula allows for a gradual and ramped value of the fan drive except at the 70% junction. By conducting frequent reevaluations of the value Fan%$_{T+\Delta}$ the line voltage can be adjusted to provide ongoing control of the temperature in the system $T_F$. In the case of DC voltage variable fans, the voltage is adjusted proportionally. For example, if a fan 16 drive of 54% is needed based on a calculated value of Fan %$_{T+\Delta}$=54%, then a fan 16 under a maximum voltage of 110 volts DC is placed under a voltage of 59.4 volts, thus greatly reducing the speed of the fan blades and the associated noise. If an AC current is used at a frequency, where the voltage varies from a negative and a maximum value along a wave function, one method of regulation is to cut or clip a portion of the wave to zero for a duration proportional to the desired adjusted voltage desired. For example, if Fan %$_{T+\Delta}$=54%, then the AC voltage to fan 16 is set to zero for a total of 46% of the time. In one preferred embodiment, the voltage is clipped in the front end of the wave. In another embodiment, the voltage is clipped at the top end of the wave.

As the compressor outlet temperature $T_C$ changes because of changes in ambient air, a greater natural convective airflow, airflow across the condenser coils, changes in the temperature of the structure, changes in applied load, modification in the refrigeration state capability, or even an air filter variation, the temperature varies, and as a result, the above algorithm changes the speed of the fan 16 and reduces the noise produced accordingly.

In one embodiment, a low-noise fan control system 1 includes a variable-speed fan 16 for venting a device (10, 11, 12, etc.) with a fluid passing through the device, a temperature of the fluid, either $T_F$ or $T_C$, being controlled at least partly by the venting action of the variable-speed fan 16. A temperature sensor 18 or 6 measures the temperature of the fluid $T_F$ or $T_C$, and a calculator 5 is connected to the fan 16 and the temperature sensor 18 or 6 for controlling a signal drive of the variable-speed fan 16, which is calculated using an algorithm running in a memory of the calculator 5. The algorithm includes the steps of selecting a high temperature threshold and a low temperature threshold of the fluid, measuring the temperature of the fluid $T_F$, $T_C$ with the temperature sensor 18, 6, and associating a signal drive speed Upper Limit to the high temperature threshold and a signal drive stall speed to the low temperature threshold Stall Limit for a fan 16 for cooling the device, wherein if the measured temperature of the fluid $T_C$, $T_F$ is equal to or greater than the high temperature threshold, the signal drive upper limit is used as the signal drive, and if the measured outlet temperature of the fluid is equal to or lower than the low temperature threshold, the signal drive stall speed is used as the signal drive. In one preferred embodiment, the temperature of the fluid is $T_C$ and the sensor is sensor 18.

When the measured temperature of the fluid $T_C$ is lower than the high temperature threshold and higher than the low temperature threshold, the signal drive is calculated using a ratio of the measured temperature over a temperature gradient of the high temperature threshold and the low temperature threshold. The signal drive is calculated using the equation $$signaldrive = \left\{\left[\frac{T_C - T_{LT}}{T_{HT} - T_{LT}}\right] * (\text{Fan } \%_T - \text{Stall})\right\} + \text{Stall}$$

where $T_C$ is the outlet temperature measured, $T_{LT}$ is the low temperature threshold, $T_{HT}$ is the high temperature threshold, Stall is the signal drive stall speed in percentage, and Fan %$_T$ is the signal drive at the previous measurement step.

In one embodiment, Fan %$_T$ is calculated by clipping a power input, such as a clipped sine power input, to the variable-speed fan for a portion of time proportional to a desired signal drive speed.

In a different embodiment, fan 16 can be regulated as part of an overall control mechanism. The control system 1 can also include an external calculator 5 or any type of computing device coupled to the different elements, actuators, and sensors for storing the different settings used by the control system 1. Ultimately, the temperature of the fluid 4 is intended to be controlled with a high degree of precision. In one embodiment, a stabilized temperature of the fluid temperature remains within ±0.01° C. of a setpoint value. Within this specification, the control system 1 is described as having sensors (T) for measuring temperatures, pressures, or any other parameter of the different portions of the physical system to be controlled or regulated. Settings (SE) are used and entered into the external calculator 5 to be calculated in conjunction with the other types of data to actuate the different actuators (A) capable of acting upon the control system 1.

Figure 3:
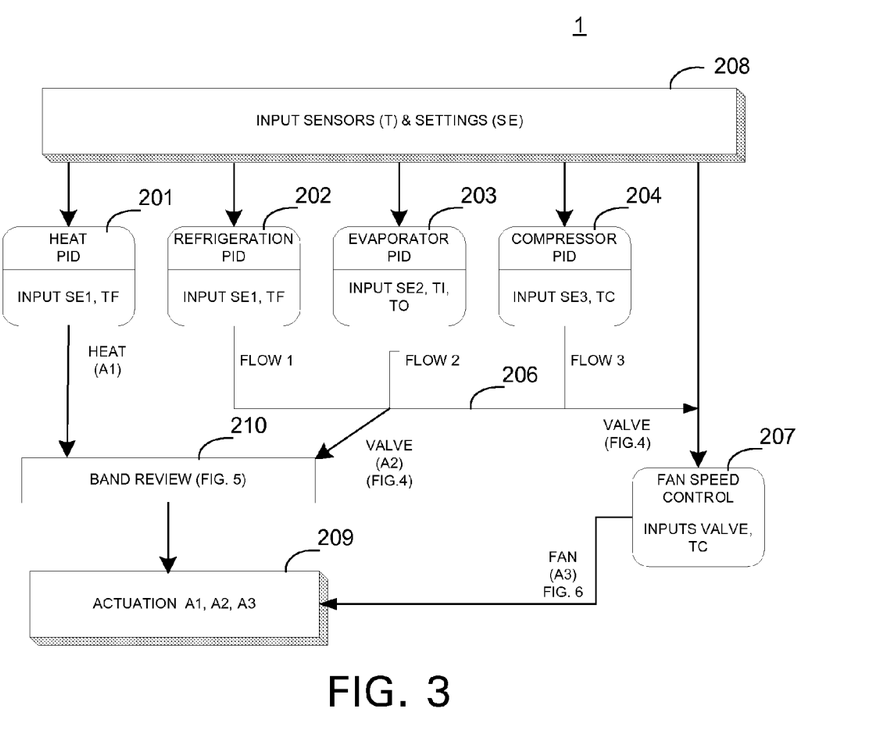
FIG. 3 is a schematic representation of a multi-PID controller system according to an embodiment of the present disclosure.

In one embodiment, the control system 1 of FIG. 1 includes multi-PID controllers as shown diagrammatically in FIG. 3, which could be applied to any physical embodiment. In one preferred embodiment shown in FIG. 1, a fluid 4 within a tank 2 requires four sensors ($T_F$, $T_I$, $T_O$, and $T_C$) and nineteen programmed settings ($SE_1$ to $SE_{19}$). FIG. 3 illustrates how the different input sensors (T) and settings (SE) 208 are used as entry data source for the control system 1.

Figure 2:
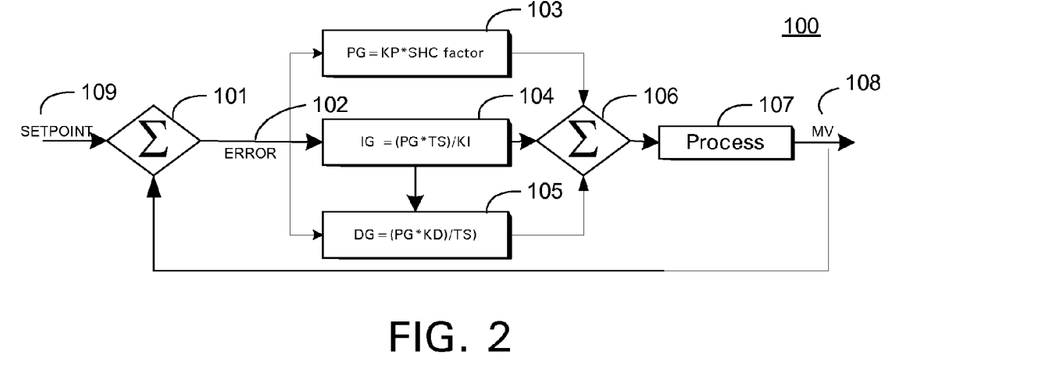
FIG. 2 is a sample PID controller regulator according to an embodiment of the present disclosure.

FIG. 2 is a sample diagram of a PID controller 100 with a setpoint 109 located at the left of the diagram. The output 108 is shown by the manipulated variable (MV) once the process 107 has been performed. PID controllers are loops where a value 108 is compared 101 in a first step to the setpoint value 109 to determine an error 102 or a variation from the desired setpoint 109. This error value is then processed using either a proportional term (P=$K_P$* e(t)), a integral term (I=$K_I$*f($\tau$)d$\tau$), or a derivative term (D=$K_D$*de(t)/dt). Each term (P, I, and D) is tuned using a gain ($K_P$, $K_I$, and $K_D$, respectively). These variables can be tuned based on the expected response of the PID controller. Once the different terms have been evaluated (103, 104, and 105), the calibrated correction is then summed 106 before it is sent to the process 107 and a new MV value 108 is calculated after the process is performed 107.

In the described embodiment as shown in FIG. 1, the temperature of the fluid $T_F$ can be measured using sensors at four different positions in the system 1. The fluid temperature $T_F$ is measured at a sensor 6. In the refrigeration cycle, the temperature of the refrigeration fluid is measured at the input of the evaporator $T_I$, the output of the evaporator $T_O$, and the output of the compressor $T_C$ via temperature sensors illustrated in FIG. 1. Small temperature sensors, such as gauges, can be used.

In one contemplated embodiment, the control system 1, using the external calculator 5, uses nineteen settings ($SE_1$ to $SE_{19}$) listed as $SE_1$ (target fluid temperature), $SE_2$ (target differential evaporator set point), $SE_3$ (target compressor set point), $SE_4$ (efficiency of the biases over time), $SE_5$ (deadband), $SE_6$ (specific heat), $SE_{7,8,9}$ (gain coefficients for HEAT PID), $SE_{10,11,12}$ (gain coefficients for REFRIGERATION PID), $SE_{13,14,15}$ (gain coefficients for EVAPORATOR PID), $SE_{16,17,18}$ (gain coefficients for COMPRESSOR PID), and $SE_{19}$ (volume of fluid).

FIG. 3 shows the different input sensors (T) and settings (SE) used as set points for four different PIDs 201, 202, 203, and 204. In one embodiment, four PIDs are used to control three actuators A of the system 1, namely, the voltage of the heater resistance $A_1$, the flow $A_2$ of the flow control valve 12, and the speed $A_3$ control of the fan 16. These controls are made by a HEAT PID 201 with $SE_1$ and $T_F$ as inputs, a REFRIGERATION PID 202 with $SE_1$, and $T_F$ as inputs, an EVAPORATION PID 203 having $SE_2$, $T_I$, and $T_O$ as inputs, a COMPRESSOR PID 205 having $SE_3$ and $T_C$ as inputs, and finally, a FAN SPEED CONTROL module 207 with VALVE and $T_C$ as inputs. The control of the fan speed 207 requires a valve input and is thus dependant upon the PIDs.

Figure 4:
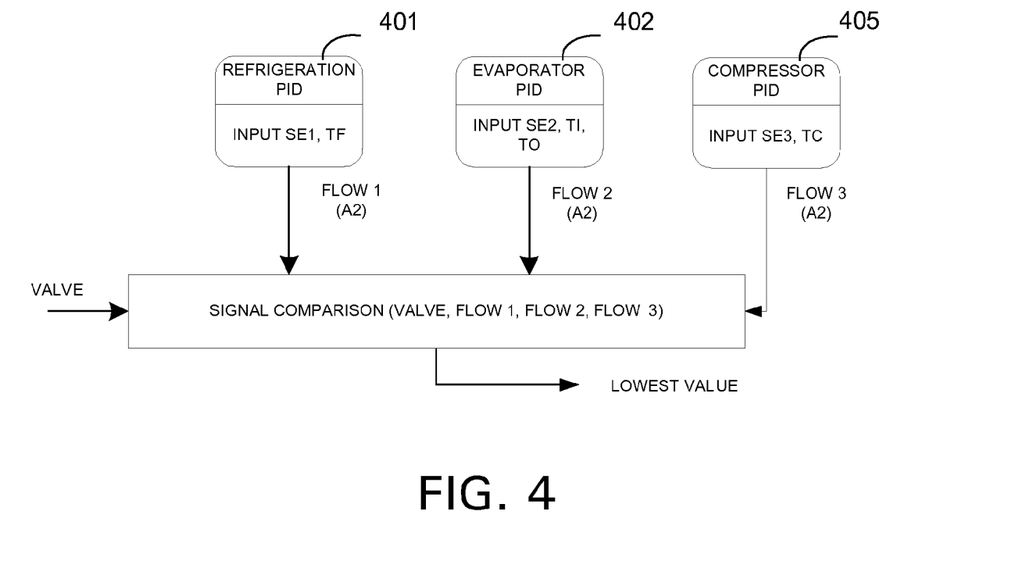
FIG. 4 is an illustration of the algorithm for optimal regulation of the flow control of the valve in the refrigeration system based on each output from the multi-PID outputs of FIG. 3.

FIG. 3 shows how the manipulated variable of the HEAT PID 201 is HEAT, which is also referred to as a voltage value for the heater resistance $A_1$. The manipulated variable of the REFRIGERATION PID 202 is FLOW 1 or a first output variable on a scale of 0% to 100% of the desired flow of the control valve 12. The manipulated variable of the EVAPORATOR PID 203 is FLOW 2 or a second output also variable on a scale of 0% to 100% of the desired flow of the control valve 12. The manipulated variable of the COMPRESSOR PID 204 is FLOW 3 or a third output also variable on the scale of 0% to 100% of the desired flow of the control valve 12. These three manipulated variables (FLOW1, FLOW2, and FLOW3) are then merged and compared 206 as shown in FIG. 4 to determine how the actuator $A_2$ is actuated using a value also referred to as VALVE on the scale of 0% to 100% of the flow of refrigerant in the control valve 12. As shown in FIG. 4, the lowest value between FLOW 1, FLOW 2, and FLOW 3 is then taken to control the VALVE.

Figure 5:
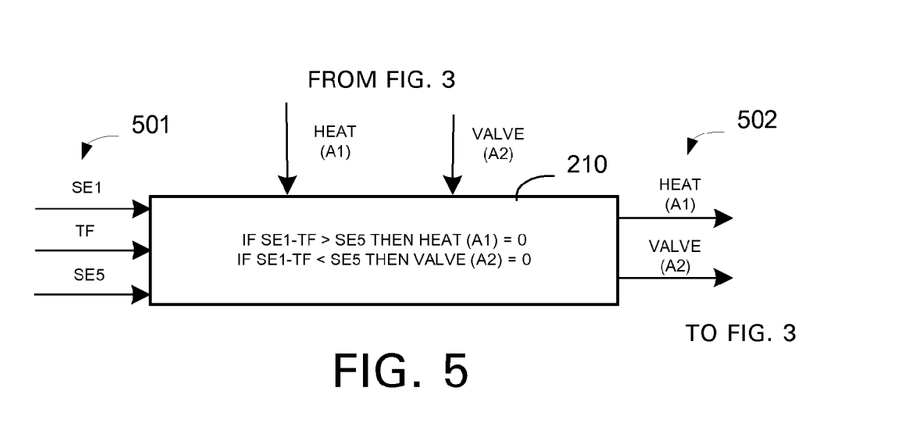
FIG. 5 is an illustration of the algorithm for conducting a band review as shown in FIG. 3.

Returning to FIG. 3, once the value of VALVE is determined, the value of HEAT is also calculated, and these values are reviewed for a deadband (DB) 210 before the final actuation figure is performed 209. The algorithm associated with the deadband module 502 is shown in FIG. 5. The deadband value $SE_5$ is entered by the user as a setting and is taken as ±0.5° C. This figure allows for the cooling actuation value $A_2$ or the heating actuation value $A_1$ to be regulated closely when the temperature of the fluid $SE_1$ enters the deadband (i.e., within $SE_5$ of $SE_1$).

In a first step, the temperature of the fluid $T_F$ is compared with the desired temperature of the fluid $SE_1$. If the value is positive and greater than the deadband ($SE_1 - T_F > SE_5$), then the desired temperature $SE_1$ of the fluid is still greater than measured temperature $T_F$ plus the deadband value, and therefore, the heat must be turned off. Once the measured temperature $T_F$ falls within the deadband range of the desired temperature $SE_1$, the heat is activated. The cold function of the VALVE is regulated in the same way on the other end of the deadband. If the desired temperature $SE_1$ is inferior to the measured temperature $T_F$ plus the deadband ($SE_1 - T_F < SE_5$), then the cold must be cut off 210. The described process allows a greater balance of the cold and the heat on the fluid to provide the best push-and-pull characteristics necessary to provide the desired fluid temperature stability as the PID-determined values are corrected within the deadband 210 (i.e., either $A_2$ or $A_1$ is forced to zero in the deadband).

Figure 6:
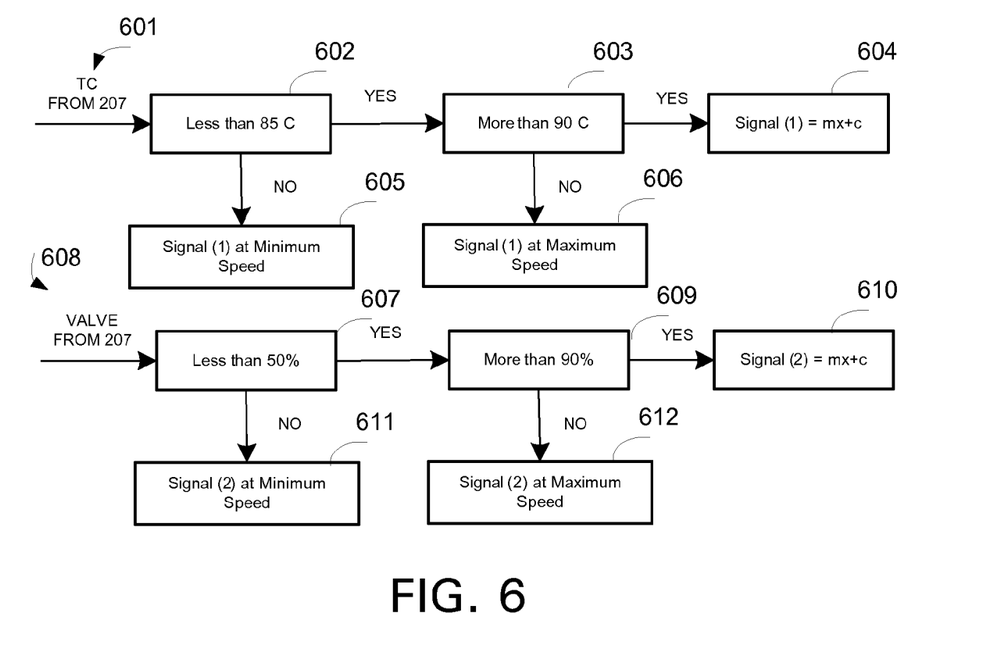
FIG. 6 is an illustration of the algorithm for determining the speed associated with two different signals for the control of the fan as shown in FIG. 3.
Figure 7:
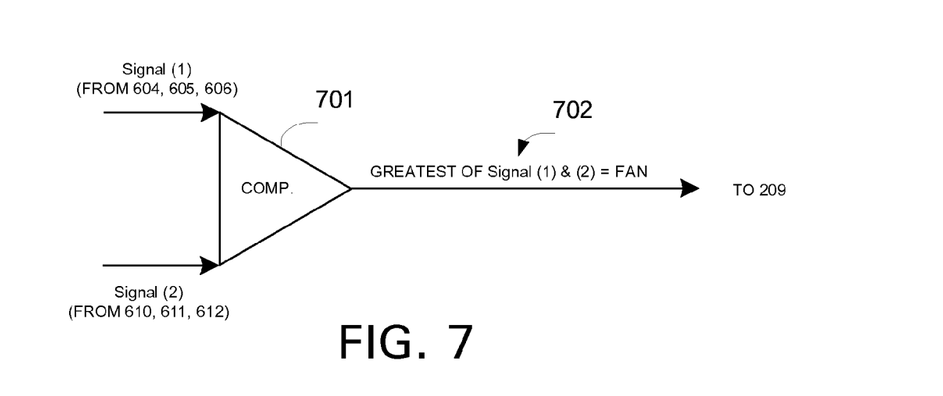
FIG. 7 is an illustration of the algorithm for selecting a single signal from the two signals for the control of the fan as shown in FIG. 6.

FIGS. 6 and 7 show the logical steps associated with the regulation of the FAN 207 as shown in FIG. 3. Two input values are used to regulate the signal of the fan in a linear mode (regulation=mx+c where m is a constant, x is a linear value from 0 to 1, and c is an offset value). Two signals are reviewed, and the greater of the signals (1) or (2) is compared 701 as shown in FIG. 7 and sent to the actuator A3 702. First, if $T_C$ is less than 85° C. 602, the signal (1) is taken at a minimum speed 605 (i.e., where x=0). In a subsequent step, if $T_C$ is more than 90° C. 603, the signal (1) is taken to be a maximum speed 606 (i.e., where x=1). In the range between 85 and 90 degrees, the signal is a linear progression from c to m+c.

Second, if VALVE as an input less than 50% 607, the signal (2) is taken at a minimum speed 611 (i.e., where x=0). In a subsequent step, if VALVE is more than 90% 609, the signal (2) is taken to be a maximum speed 612 (i.e., where x=1). In the range between 50 and 90%, the signal is a linear progression from c to m+c. The values as described are only illustrative of one possible embodiment. Regulation using a maximum and a minimum value in association with a function or any degree is contemplated.

Calculation of fluid energy within the fluid is also contemplated. In one embodiment, this energy is measured every ten seconds and calculated using the temperature of the fluid $T_F$ compared to the temperature of the fluid 10 seconds in the past to obtain a temperature difference $T_D$. The energy difference is a function of $SE_6$, $SE_{19}$, and $T_D$.

While what is described is a multi-PID system 1 where three different temperatures of the refrigeration fluid are measured ($T_C$, $T_F$, $T_O$), a system where the measure of two, four or even more temperatures, each associated with a sensor and used as an input to a different PID of the multi-PID controller 1, is contemplated. Similarly, three actuators are used to act upon the system as shown in FIG. 1, namely, $A_1$, $A_2$, and $A_3$. One actuator $A_2$ requires the calculation using a multi-PID system, one actuator A1 is calculated using a regular PID, and one actuator $A_3$ is calculated using a linear progression based on the calculated value of $A_2$. While one configuration of regulation is described, the use of any combination, grouping, or regulation for the different actuators is contemplated. For example, six actuators could be used to regulate a system. Each of these actuators could be calculated using a multi-PID controller based on a series of sensors.

In the described embodiment, water is used as a medium to be regulated. What is contemplated is any regulation and control system for any technology where a multi-PID controller can be used, including, for example, sensors such as pressure gauges, flow detectors, or the like. In the preferred embodiment, the REFRIGERATION PID 202 is compared to both the EVAPORATION PID 203 and the COMPRESSOR PID 204. By maintaining a value of 4.0° C., the refrigerant in the superheated conditions remains encompassed by the evaporator coil. The COMPRESSOR PID 204 is used last to prevent the refrigerant from boiling or flooding the system.

Finally, fluid energy is calculated from the volume of the fluid $SE_{19}$ multiplied by the specific heat capacity and a difference in computed temperatures. In one embodiment, the current temperature of the fluid $T_F$ is compared to the temperature of the fluid ten seconds in the past. By looking at the variation of the fluid energy over time, industry standard units can be used and the equilibrium setpoint can be controlled. By comparing the energy variation with the energy sent to the actuators, the efficiency of the system can be reviewed.

In one embodiment, a control system 1 includes a first PID controller 202 for calculating a first control FLOW 1 of a manipulated variable 108 as shown in FIG. 2 using a first sensor input such as the temperature of the fluid $T_F$ as shown in FIG. 3 and a first setting input such as $SE_1$. A second PID controller 203 is used for calculating a second control FLOW 2 of the manipulated variable 108 using a second sensor input such as $T_I$, $T_O$, or $T_I - T_O$ as shown in FIG. 3 and a second setting input such as $SE_2$. The actual control of the manipulated variable VALVE is selected from the first control FLOW 1 and the second control FLOW 2 using a function. One such function is shown in FIG. 4.

In one embodiment, the actual control VALVE is refrigeration of the fluid 4 using a flow control valve 12. The system can also include a heat variable PID controller 201 for calculating a heat control HEAT of a resistive element 7 using a temperature sensor 6, and the refrigeration VALVE and the heat control HEAT are selectively activated within a band value 210. In one alternate embodiment, a linear control system 207, such as a fan speed control, actuates the fan 209 using either the actual control VALVE as shown in FIG. 3 or a third sensor $T_C$ as input for controlling an actuator such as the fan.

In another embodiment, a controlled apparatus 1 as shown in FIG. 1 includes a refrigeration system with a condenser 10, a compressor 11, an evaporator 8, and a flow control valve 12. The evaporator 8 is in thermal contact with a fluid 4 in a tank 2. For example, the evaporator can be a coil placed at the bottom of a tank or suspended in the fluid 4. A heating system includes a resistive heater 7 also in thermal contact with the fluid 4 in the tank 2. The apparatus also includes a fluid temperature sensor 6 in the fluid 4 of the tank 2, a compressor exit sensor 18, an evaporator entry sensor 19, and an evaporator outlet sensor 17, each in contact with the refrigeration system shown as a loop.

The control system 5 as shown in FIG. 1 is connected via cables to the different components, actuators, and sensors of the system and includes three PID controllers as shown in FIG. 3. In one embodiment, the third PID uses the compressor exit sensor as input 204, the second PID uses the evaporator entry sensor as input 203, and the first PID uses the evaporator outlet sensor as input 202. The flow control valve 12 is controlled by one of the three PID controllers 202, 203, 204, using a function shown in one embodiment in FIG. 4.

The function includes a comparison 407 of a control FLOW 1, 2, or 3 with the existing control VALVE and the use of the lowest control as the actual control. A second control system for controlling heat from the resistive 7 heater with a heat variable PID controller 201 and the control of the heating system and the refrigeration system are selectively activated as shown in FIG. 5 within a band value such as 0.5° C. using a band control 210. The condenser 10 can also include a fan 16 controlled by a linear control system such as an equation of the type Control=constant*variable+offset (v=mx+c). In FIG. 3, the linear control system 207 of the fan 16 is connected to the flow control valve 12 or the compressor exit sensor $T_C$ as shown for input.

In another embodiment, the refrigeration cycle control system 1 can include a temperature sensor 6 ($T_C$, $T_0$, $T_F$, or even $T_1$) to measure the temperature of a fluid 4 in a refrigeration loop 9 comprising at least a device 10. For example, a condenser 10 and a flow control valve 12 regulate a flow of fluid shown as $A_2$ on FIG. 1 within the refrigeration loop 9. The variable-speed fan 16 vents the at least one device 10 and the system 1 also includes a temperature of the fluid 4 being controlled at least partly by a speed of rotation of the variable-speed fan 16 and an opening of the flow control valve 12. Further, a calculator 5 is connected to the fan 16, the temperature sensor 18 or 6, and the flow control valve 12 to control a signal drive of the variable-speed fan 16 and an aperture of the flow control valve 12 using an algorithm running in a memory of the calculator 5 where the following steps are run in memory in any order. The steps are, firstly, measuring the temperature $T_C$ of the fluid 4 with the temperature sensor 18; secondly, using a first PID controller (201, 202, 203, 204) shown in FIG. 2 and displayed in FIG. 3 for calculating a control of the flow control valve 12 using a sensor input and a setting input; and thirdly, calculating a signal drive of the fan 16 using a ratio of the measured temperature at the temperature sensor over a temperature gradient of a high temperature threshold $T_{HT}$ and a low temperature threshold $T_{LT}$.

In an alternate embodiment, a second PID as shown in FIG. 2 as either the heat PID 201, the refrigeration PID 202, the evaporator PID 203, or the compressor PID 204 controller is used as part of the algorithm to calculate the control of the flow control valve 12. The algorithm can further include a step of comparing a first control from the first PID controller 201, 202, 203, 204 and a second control from the second PID 201, 202, 203, 204 as shown in FIG. 3 and selecting the lowest needed opening of the flow control valve as control as shown in FIG. 4. The algorithm running in the memory of the calculator 5 can also comprise a step of using of a third PID controller 201, 202, 203, 204 for calculating the control of the flow control valve 12 in much the same way the second PID controller is used to compare to the first PID as shown in FIG. 4.

Finally, in yet another embodiment, a low-noise refrigeration device 1 can include a cooling system with a condenser 10, a compressor 11, an evaporator 8, and a flow control valve 12, where the evaporator 8 is in thermal contact with a fluid 4 in a tank 2, a heating system 7 with a resistive heater 20 is in thermal contact with the fluid 4 in the tank 2, a fluid temperature sensor 6 is in the fluid 4 of the tank 2, and a compressor exit sensor 18, an evaporator entry sensor T1, and an evaporator outlet sensor T0 are each in contact with the refrigeration system 9.

The system 9 further includes a variable-speed fan 16 for cooling a portion of the fluid 4 and a control system 5 for controlling the flow of the flow control valve 12 and the speed of the variable-speed fan 16 using at least two PID controllers 201, 202, 203, and 204 as shown in FIG. 3 and a temperature ratio as described in one possible embodiment as the temperature at the outlet of the compressor $T_C$ over a range of acceptable threshold temperatures $T_{HT}$, $T_{CT}$ at that point determined by the system. The range of temperatures $T_{HT}$ to $T_{CT}$, which is prorated between the threshold values associated with specific speeds of the fan 16, is one possible range or ratio contemplated. One of ordinary skill in the art of control will recognize that other ratios can be used or determined, including but not limited to a range from the maximum operating temperature encountered minus the minimum encountered by the sensor 18 over a set period of time.

In yet another embodiment, the fan 16 is regulated using a PID calculator with the following parameters:

$$P = kP * (\text{Error}_T - \text{Error}_{T-1}) \quad I = \frac{(\text{Error}_T * T)}{kL}$$

$$D = \frac{([\text{Error}_T + \{3 * \text{Error}_{T-1}\} - \{3 * \text{Error}_{T-2}\} - \text{Error}_{T-3}])}{6 * T}$$

Where time measures T may be fixed as 1 second in one embodiment, and where $\text{Error}_T$ is the error correction at the current iteration, $\text{Error}_{T-1}$ is the error correction one second ago or at the previous iteration, $\text{Error}_{T-2}$ is the error correction two iterations ago, and $\text{Error}_{T-3}$ is the error three iterations ago. One of ordinary skill in the art of PID calculation will understand how errors are incrementally advanced over time with a revolving value.

Where the $\text{Error}_T$ is taken to be for a single sensor application (with only $T_C$), and with a dual sensor application (with $T_C$ and $T_2$) respectively:

$$\text{Error}_T = (T_C - [K_1 + K_2]) \quad \text{Error}_T = (T_C - T_2)$$

Where $K_1$ is a setpoint variable for the fan and condenser efficiency, and $K_2$ is a setpoint offset value based on the temperature of the fluid $T_F$ to be controlled. In one embodiment, $K_1$ is around 70° C., and $K_2$ is an offset in the range of 0.0 to 20.0° C. $K_2$ is further determined as a function of a setpoint of the instrument fluid $T_F$ normally in the range of −50° C. to 250° C. If $T_F$ is below 0.0° C., then $K_2$=0.0; if $T_F$ is above 20.0° C., then $K_2$=20.0° C. otherwise, $K_2$=$T_F$. In the preferred embodiment, kP is taken to be 1.0, kI is taken to be 300, and kD is taken to be 1.0.

The variable fan speed (Fan $\%_T$) taken at an interval of time T is then defined with kI, kD, and kP taken as 300, 1, and 1 respectively:

$$\text{Fan } \%_T = \text{Fan } \%_{T-1} + P + I + D$$

$$\text{Fan } \%_T = \text{Fan } \%_{T-1} + (\text{Error}_T - \text{Error}_{T-1}) +$$
$$300\text{Error}_T + \frac{\text{Error}_T + 3\text{Error}_{T-1} - 3\text{Error}_{T-2} - \text{Error}_{T-3}}{6}$$

If a value of Fan $\%_T$ greater than 100% is calculated, then the value is limited to 100, and if a value of Fan $\%_T$ is calculated smaller than 0, then a value of 0 or a stall value of 24% is taken.

As way of numerical example, water in a bath is at $T_F=78°$ C. and the instrument setpoint is also 78° C. with a setpoint variable for a fan/condenser efficiency of 70° C. The $K_2$ is then taken to be 20° C. since the value of $T_F$ is greater than 20° C. The $\text{Error}_T$ is calculated as $\text{Error}_T=T_C-90°$ C. If, for example, the temperature of the outlet of the compressor $T_C$ is measured at 97° C., then $\text{Error}_T=7°$ C. and the initial Fan $\%_T$, if currently at a minimum stalling value of 24%, can be calculated after 1 second as follows:

$$\text{Fan } \%_T = 24\% + (7 - 0) + \frac{7}{300} + \frac{7}{6} = 32.2\%$$

In this first time increment, the proportional portion of the PID dominates the equation and rapidly increases the fan speed. The increase in the speed of the fan of 7.8% is regular over the previous second. This increase in the speed of the fan results in greater cooling at the condenser and thus a lower end temperature at the exit of the compressor. Taking into effect the inertia of the system, in this example the temperature of the setpoint remains at 78° C. Therefore, the value 7° C. calculated in the previous step to be $\text{Error}_T$ becomes $\text{Error}_{T-1}$ and a new $\text{Error}_T$ is calculated as $\text{Error}_T=7°$ C. since none of the measured temperatures have yet changed due to the additional cooling associated with the faster fan. In a second increment, the fan speed can be calculated as follows:

$$\text{Fan } \% = 32.2\% + (7 - 7) + \frac{7}{300} + \frac{(7 + 21)}{6} = 37\%$$

At this second time increment, the derivative portion of the equation dominates and provides most of the 4.8% increase in fan speed. Since the measured temperatures have not changed, the regulation moderates the increase accordingly. In a third time increment, where $\text{Error}_T$ is reset as an open value and calculated, the increase in fan speed may have led to greater cooling and a compressor exit temperature $T_C$ of only 96° C. (a decrease of 1° C.). $\text{Error}_{T-1}$ and $\text{Error}_{T-2}$ calculated above remain 7° C. and the new Fan % is then calculated as follows:

$$\text{Fan } \% = 37\% + (6 - 7) + \frac{6}{300} + \frac{((6 + 21 - 21)}{6} = 37.2\%$$

This time, both the proportional and differential portions of the PID cancel each other and the integral portion of 0.2% controls the fan speed increase. As a result of the decrease of temperature from 97° C. to 96° C., the fan speed remains essentially constant for the next time interval. If the compressor exit temperature $T_C$ continues to decrease, for example, down to 95° C. in this example, then fan speed control can be calculated as follows:

$$\text{Fan } \% = 37.2\% + (5 - 6) + \frac{5}{300} + \frac{((5 + 15 - 18 - 7)}{6} = 35.4\%$$

The fan speed is in fact lowered by 1.8% to accommodate for a rapid drop in the compressor exit temperature. By increasing the fan speed, the variable airflow across the condenser increases and the ambient noise also changes. An increase in fan speed changes a plurality of effects, including the amount of airflow, the air flowing across the condenser coil, changes in compressor temperature, changes in applied load, changes in refrigeration state capability, such as the ability to remove heat, and changes in air filter conditions.

Persons of ordinary skill in the art appreciate that although the teachings of this disclosure have been illustrated in connection with certain embodiments and methods, there is no intent to limit the invention to such embodiments and methods. On the contrary, the intention of this disclosure is to cover all modifications and embodiments falling fairly within the scope the teachings of the disclosure.

What is claimed is:

1. A low-noise fan control system, comprising:
a variable-speed fan for venting a device with a fluid passing therein and in thermal contact therewith, a temperature of the fluid being controlled at least partly by the venting action of the variable-speed fan;
a temperature sensor to measure the temperature of the fluid at an outlet of the device; and
a calculator electrically connected to the variable-speed fan for calculating a signal drive of the variable-speed fan to regulate the speed of the fan calculated using an algorithm running in a memory of the calculator comprising the steps of:
determining a initial fan regulation variable;
sending to the variable-speed fan a first regulation variable; and
sending at regular time increments a new regulation variable to the variable-speed fan by measuring a setpoint of the device, measuring the temperature at the sensor, and calculating a first error value based of the temperature at the sensor and the setpoint of the device.

2. The low-noise fan control system of claim 1, wherein the calculation of the first error value is equal to the temperature at the sensor minus the setpoint of the device including a setpoint variable for the variable-speed fan and the device efficiency, and a setpoint offset value based on the temperature of the fluid to be controlled.

3. The low-noise fan control system of claim 2, wherein the new regulation variable is calculated by adding to the current variable-speed fan regulation variable to a proportional, an integral, and a derivative term of a PID controller.

4. The low-noise fan control system of claim 1, wherein the device is a compressor and a condenser, and the temperature sensor measures the temperature at the outlet of the compressor.

5. A low-noise fan control system, comprising:
a variable-speed fan for venting a condenser and a compressor with a fluid passing therein and in thermal contact therewith, a temperature of the fluid being controlled at least partly by the venting action of the variable-speed fan;

a first temperature sensor to measure the temperature of the fluid at an outlet of the condenser;

a second temperature sensor to measure the temperature of the fluid at an outlet of the compressor; and a calculator electrically connected to the variable-speed fan for calculating a signal drive of the variable-speed fan to regulate the speed of the fan calculated using an algorithm running in a memory of the calculator comprising the steps of:

determining a initial fan regulation variable;

sending to the variable-speed fan a first regulation variable; and sending at regular time increments a new regulation variable to the variable-speed fan by measuring an error based on a first temperature from the first temperature sensor and a second temperature from the second temperature sensor.

6. The low-noise fan control system of claim 5, wherein the new regulation variable is calculated by adding to the current variable-speed fan regulation variable to a proportional, an integral, and a derivative term of a PID controller.

7. The low-noise fan control system of claim 6, wherein the proportional term includes a constant, the integral term includes a constant, and the derivative term includes a constant, and wherein the integral constant is substantially larger than the derivative and proportional constants.

* * * * *